R. V. MORSE.
SUBMARINE PROPULSION SYSTEM.
APPLICATION FILED APR. 26, 1915.

1,367,708.

Patented Feb. 8, 1921.
5 SHEETS—SHEET 1.

Fig. 1.

Inventor
Robert V. Morse

R. V. MORSE.
SUBMARINE PROPULSION SYSTEM.
APPLICATION FILED APR. 26, 1915.

1,367,708.

Patented Feb. 8, 1921.

R. V. MORSE.
SUBMARINE PROPULSION SYSTEM.
APPLICATION FILED APR. 20, 1915.

1,367,708. Patented Feb. 8, 1921.
5 SHEETS—SHEET 4.

Witnesses:
P. J. Gathmann

Inventor:
Robert V. Morse

R. V. MORSE.
SUBMARINE PROPULSION SYSTEM.
APPLICATION FILED APR. 26, 1915.

1,367,708.

Patented Feb. 8, 1921.
5 SHEETS—SHEET 5.

UNITED STATES PATENT OFFICE.

ROBERT V. MORSE, OF ITHACA, NEW YORK.

SUBMARINE PROPULSION SYSTEM.

1,367,708.      Specification of Letters Patent.      Patented Feb. 8, 1921.

Application filed April 26, 1915. Serial No. 24,108.

*To all whom it may concern:*

Be it known that I, ROBERT V. MORSE, a citizen of the United States, residing at Ithaca, in the county of Tompkins and State of New York, have invented a new and useful Submarine Propulsion System, of which the following, taken with the accompanying drawings, is a specification.

My invention relates to a propulsion system for submarines, and has for its main object the improvement of the speed and maneuvering qualities of such vessels. Submarine attacks have been evaded because the submarine vessel was unable to make sufficient speed, particularly when forced to rely solely on its electrical propulsion, as when running submerged. The object of my invention is to arrange the electrical part of the propulsion system so that greatly increased power may be exerted by it for limited periods, while also arranging it so that a moderate power may be developed for extended periods when desired. Thus when the enemy has been sighted, the submarine may overtake it through a temporary burst of speed. Another object of my invention is, by increasing the power of the electric motor, to permit the submarine to be quickly accelerated or reversed. Another object is to permit the use of less bulky oil engines through employing higher rotative speeds; and various other objects will appear in the following specification.

In the drawings which form part of this specification.

Figure 1:
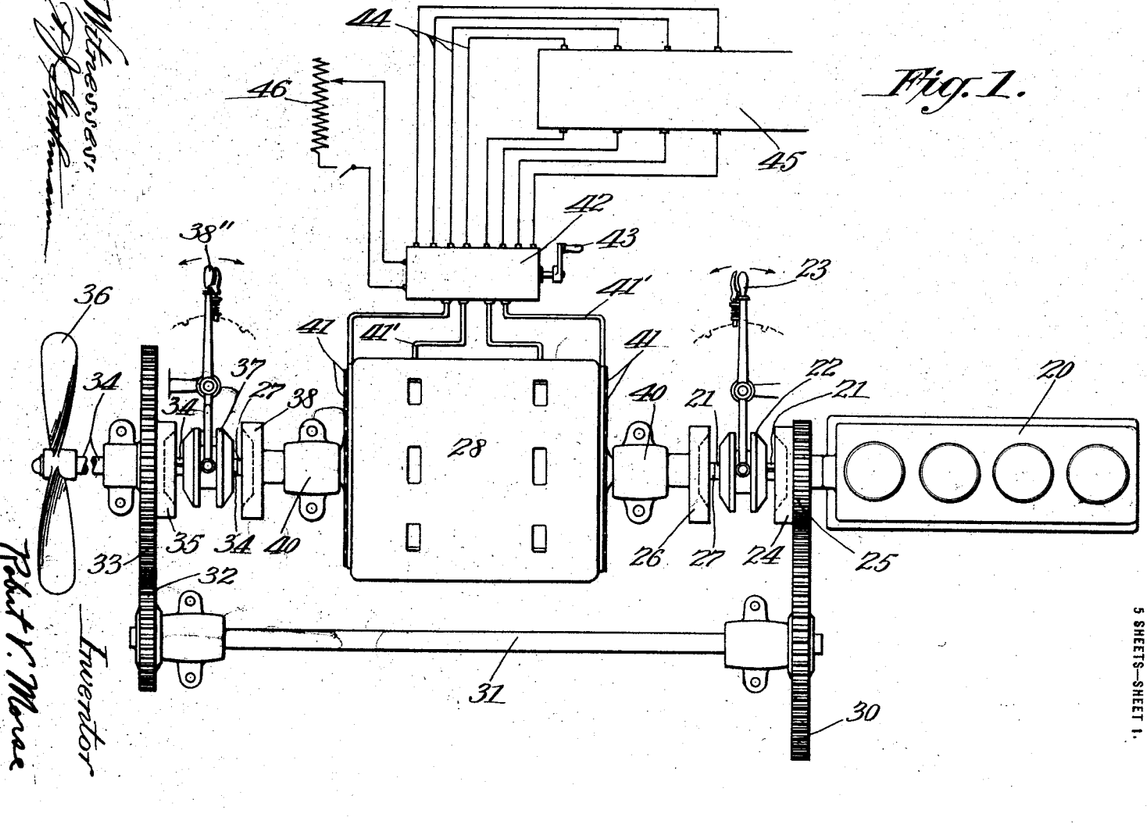
Figure 1 is a general plan of the propulsion system, including the reduction gearing to permit high engine speed with cruising propeller speed.

In Fig. 1 the internal combustion engine or prime-mover 20 drives the shaft 21, on which is keyed the double clutch member 22, adapted to be operated by the lever 23. One face of the clutch member 22 is adapted to engage the clutch member 24 attached to the gear wheel 25 which turns freely on the engine shaft 21. The other face of the clutch member 22 is adapted to engage the clutch member 26 on the shaft 27 of the homopolar machine 28. The clutch member 22 may engage either the clutch member 24 or 26 as desired. The gear wheel 25 drives the gear wheel 30, either directly through teeth or preferably by silent chain gearing, (not shown). Silent chains, which have now been developed to transmit 1000 H. P. or more, are applicable to this service because only the power for cruising ever passes through the gearing,—the engines and motors being direct-connected when driving the vessel at full speed. The particular form of the gearing however is immaterial. The gear wheel 30 is attached to the countershaft 31, which transmits the power to the gearing 32, 33, which is similar in general to the gearing 25—30. This chain of gearing, 25, 30, 32, 33, operates as a reduction gear between the engine 20 and the clutch member 35, which is attached to the gear wheel 33. The gear wheel 33 turns freely on the propeller shaft 34 carrying the propeller 36. Slidably keyed on the propeller shaft 34 is the double clutch member 37, which may be operated through the lever 38". Secured on the shaft 27 of the homopolar machine 28 is the clutch member 38. The clutch member 37 on the propeller shaft 34 may be engaged with either the clutch member 35 or the clutch member 38 as desired. If a very slight loss of power is not objectionable, either the clutch member 24 or 35 may be dispensed with; that is, either the gear wheel 25 may be permanently keyed to the shaft 21, or the gear wheel 35 may be keyed to the shaft 34. The reduction gearing would then merely turn idly without transmitting power, when the remaining clutch in the reduction gearing was disconnected. The shaft 27 of the homopolar machine 28 is journaled in the bearings 40, 40 and carries the armature of the homopolar machine as will be described more in detail in connection with Fig. 3. Running from the brushes 41 of the homopolar machine 28 are a considerable number of conductors 41' leading to the circuit controller 42, by which the series and parallel arrangements of the various brushes may be readily altered, as will be described more at length in connection with Fig. 8. The handle or lever for operating the controller 42 is indicated at 43. Also connected to the circuit controller 42 are a number of battery leads 44 from a considerable number of storage battery units 45, as will be more fully described in connection with Fig. 8. Connected at times to the motor circuit is the resistance 46, which absorbs the kinetic energy of the rotating armature to bring it to a quick stop when desired.

Figure 2:
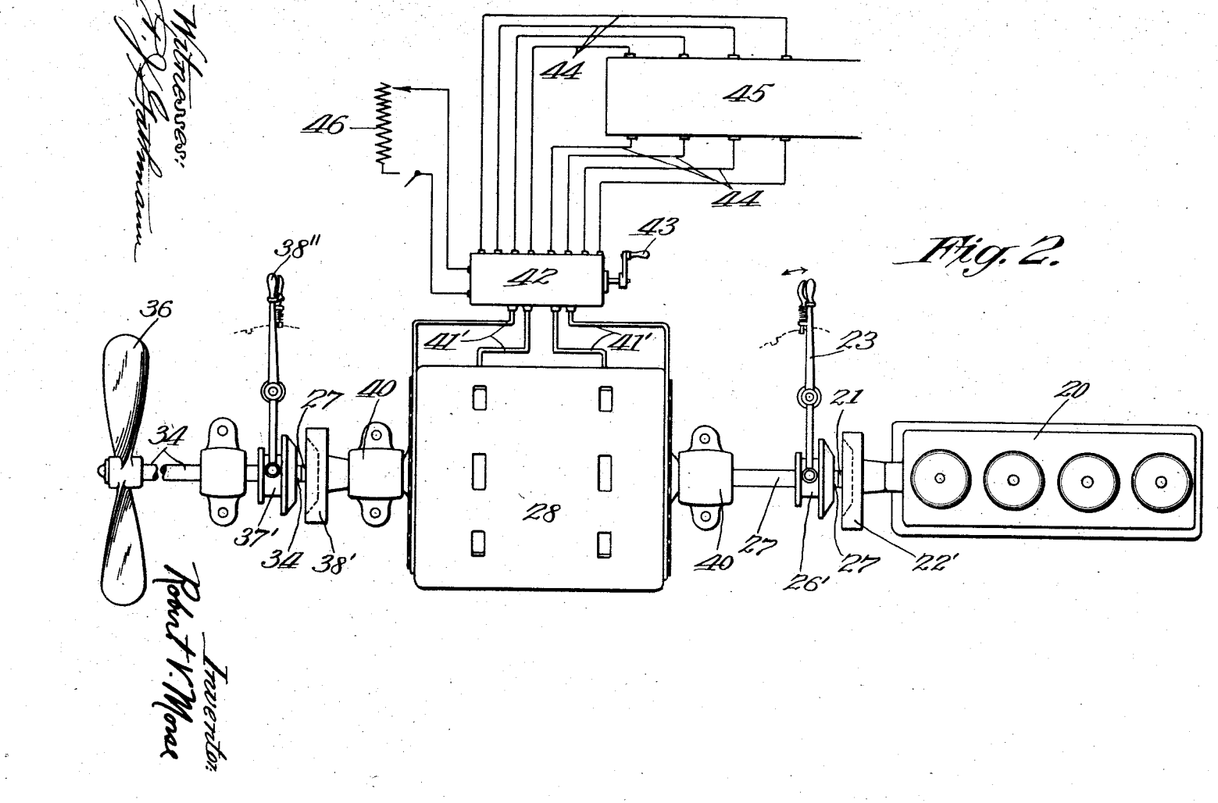
Fig. 2 is a similar plan view of a modified form, in which the reduction gearing is omitted.

The modification shown in Fig. 2 is similar in general to that above described, except that the reduction gearing 25, 30, 32, 33 is omitted, thus also dispensing with the clutches 24 and 35. Hence between the engine 20 and the homopolar machine 28 there is but the single clutch 22'—26'; and between the homopolar machine 28 and the propeller shaft 34 there is only the single clutch 38'—37', instead of the double clutches shown in Fig. 1.

Figure 3:
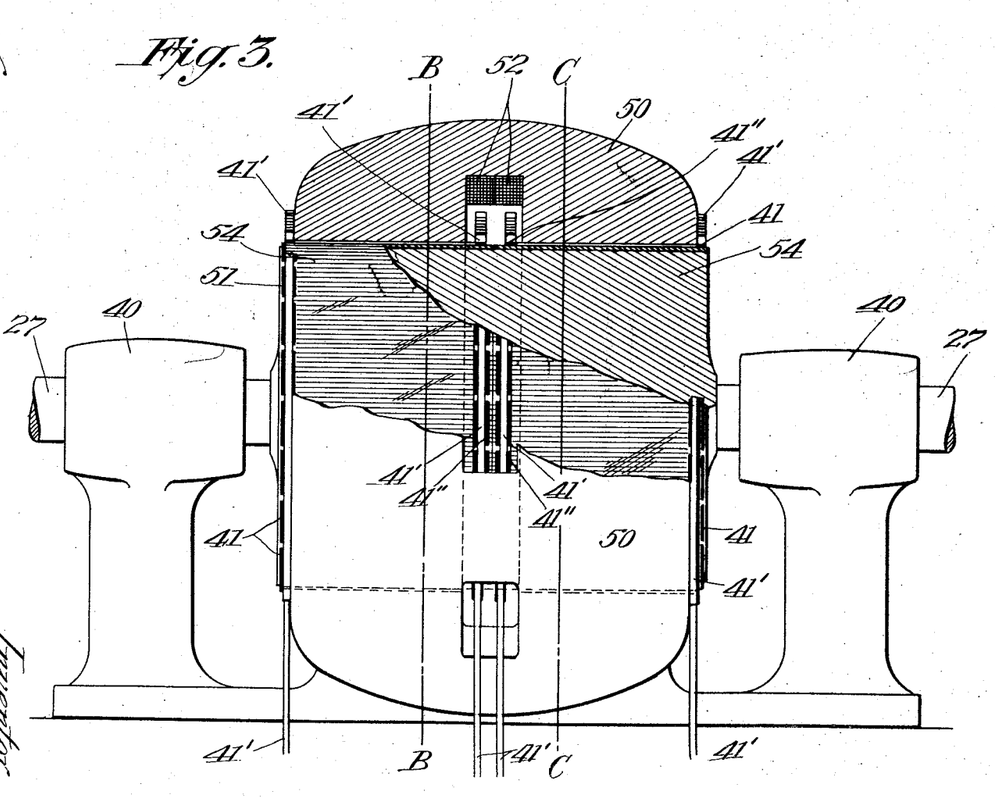
Fig. 3 is a side elevation partly in section of a typical form of motor or generator of the homopolar type, which is employed in this system.
Figure 4:
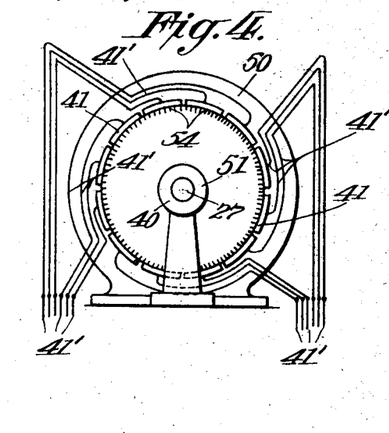
Fig. 4 is an end elevation of a similar motor or generator of the homopolar type.
Figure 5:
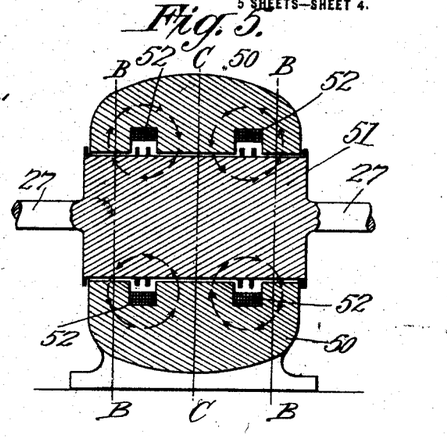
Fig. 5 is a longitudinal cross-sectional view of a homopolar machine showing a modified form of field and armature.
Figure 6:
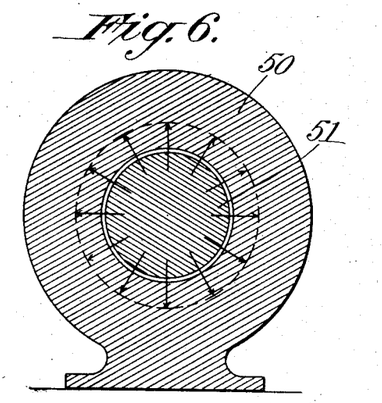
Fig. 6 is a transverse cross-section on the line B—B of Fig. 5 or Fig. 3, showing the direction of magnetic flux.
Figure 7:
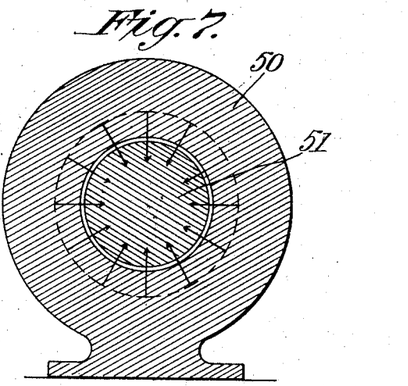
Fig. 7 is a section similar to Fig. 6 but on the line C—C of Fig. 3 or Fig. 5.

Figs. 3, 4, 5, 6, 7, and 8 illustrate the type of motor or generator employed in this system. It consists in general of a machine having homopolar fields, no commutator, and a large number of brushes connected to independent armature circuits, these brushes having external connections by which their numerous independent armature circuits may readily be connected in series or parallel to various extents as desired, to change the speed or electro-motive force of the machine. Referring to Figs. 3 and 4, the field structure of the homopolar machine is indicated by the reference numeral 50, and consists of a simple casting or castings extending entirely around the armature 51, which is carried on the shaft 27 mounted in the bearings 40, 40. The field structure 50 is excited by the field coils 52 so as to give a magnetic flux lying in generally axial planes. The direction of the magnetic flux is represented in Figs. 6 and 7 by the arrows, which show that the left hand field of Fig. 3 is annular and all of the same polarity, and the right hand field of Fig. 3 is also annular and all of the same polarity, though opposite in polarity to the left hand field. Such annular fields of unchanging polarity are called homopolar. One, two, three, four, or any number of such annular fields may be used side by side in a single machine; for example, Fig. 5 shows a field structure with three homopolar fields,—one at each end and a broad one in the middle between the two sets of field coils 52, 52. The path of the magnetic flux is indicated by the arrows; and the sectional views shown in Figs. 6 and 7 also apply to Fig. 5.

Figure 8:
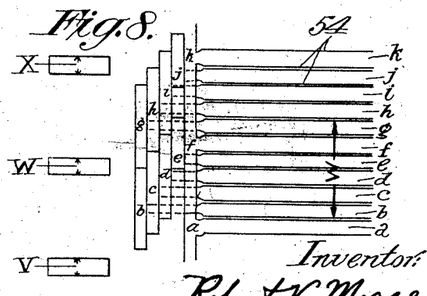
Fig. 8 illustrates a modified brush arrangement with the brushes more widely spaced.

The armature 51 has mounted in or near its periphery a large number of comparatively narrow armature conductors 54, 54, a set or zone of which extend longitudinally across each homopolar field. These armature conductors 54, 54 are insulated from each other, from the armature core, and generally from the armature conductors of other zones. Each zone of the armature conductors 54, 54 is bordered on its two edges by sets of brushes 41, 41'', which are closely spaced peripherally around the armature. The brushes need only be spaced from others in the same set to the width of a single armature conductor 54, which may be very narrow. The brushes are not necessarily so extended peripherally for as shown in Fig. 8 the heads on the conductors may be extended peripherally to meet the brushes instead of extending the brushes peripherally to meet the armature conductors. Thus in Fig. 8 the armature conductors 54, labeled—$a$, $b$, $c$, $d$, $e$, $f$, $g$, $h$, $i$, $j$, $k$,— are shown made with T shaped heads which are labeled to correspond to their respective conductors. These heads extend to meet the brushes so that for example a brush with a width equal to the width of the band of T heads, and a peripheral length equal to $w$ would contact with the heads from $b$ to $g$ inclusive and so connect with the armature conductors marked $b$ to $g$ inclusive, or equal to the extent marked $w'$. The adjacent brushes would lie at $v$ and $x$ respectively; all the brushes are shown displaced to one side for the sake of clearness. The current flows in general, with either brush construction, into the armature conductors 54 from one set of brushes as 41, and out from the armature conductors through the other set as 41'', and in the normal operation of the machine the current is not reversed in any armature at any point in its rotation; hence no commutator or other current rectifier is required. The current in general flows in opposite directions in adjacent zones, where the fields are of opposite polarity, and so in Fig. 3 it may be considered as flowing for example in at both ends of the armature and out at the middle, or vice-versa. From each brush or group of brushes runs a separate external lead 41'. The external leads 41' in going to or from their respective brushes are made to extend spirally as shown in Fig. 4, in the proper direction so that whatever magnetic flux is created around them will aid to strengthen the field of the machine. Each brush, or such groups of brushes as may be desired, has a separate external lead; and these separate terminals may be conveniently grouped where desired, as for example at the circuit controller 42. The main armature circuit is thus made up of a considerable number of shorter independent armature circuits which may receive current from separate external sources or may be connected in series or parallel to any desired extent. Because of the large cross-sectional area of the conducting material in the armature circuits enormous currents may be carried by the machine without danger of its burning out. It is this feature, among others, that makes the homopolar type particularly fitted for the requirements of this system.

Figure 9:
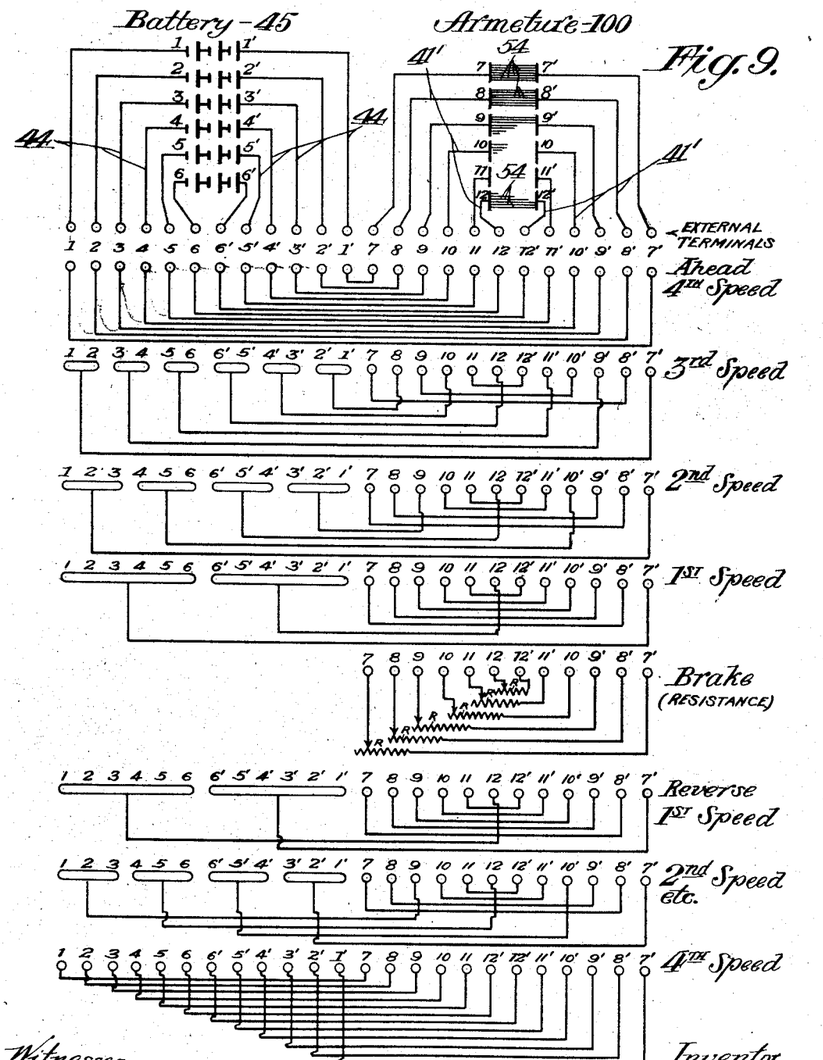
Fig. 9 is a diagram of one form of circuit controller illustrating the battery and motor connections whereby a large amount of power may be put through the motor, and how various running speeds are obtained without the use of resistances.

Having thus provided a motor or generator which can safely carry very large currents through a number of independent armature circuits, the circuit controller 42 is provided to connect the various motor circuits, and the various battery circuits in any desired combinations or arrangements. A simple arrangement of a limited number of such connections, such as could be conveniently illustrated in a limited space, is shown by way of example in Fig. 9. In the upper part of Fig. 9 a storage battery of six units is conventionally shown, the ingoing terminals of the battery being numbered respectively from 1 to 6, and the outgoing terminals being similarly numbered from 1' to 6'. Six units or groups are shown because convenient for illustration, but any number may be used, and the internal connections within each unit may be varied and arranged as will give the best results in any particular installation, and need not be discussed in detail here. From the terminals of the various battery units the leads 44 run to their respective terminals at the circuit controller, which are numbered 1, 2, 3, 4, 5, 6, 6', 5', 4', 3', 2', 1', respectively to correspond to the battery terminals. At the upper right hand side of Fig. 9 is shown a group of six armature circuits, the brushes on one side being numbered 7 to 12 respectively and the brushes on the other side numbered 7' to 12' respectively,—with the armature conductors 54 lying in between. The armature current flows longitudinally of the armature conductors across between correspondingly numbered brushes,—as between 7 and 7'; 8 and 8'; etc. The armature rotates at right angles to the current flow, that is, the armature conductors would run up or down under the brushes in Fig. 9; so that a given armature conductor might first lie under the brushes numbered 7—7'; then under 8—8'; and so on. While six pairs of brushes have been shown in Fig. 9 for convenience of illustration, it should be understood that any number of brushes might be used; and they need not necessarily lie in the same armature zone. There may also be permanent connections between brushes forming them into groups, with only one pair of external terminals from each group running to the controller. In Fig. 9 the various armature conductor units are shown connected through the leads 41' with their respective external terminals at the circuit controller,—which are numbered 7, 8, 9, 10, 11, 12, 12', 11', 10', 9', 8', 7', to correspond to the brushes. Below the line of external terminals thus brought out are shown a few of the numerous connections which can then be readily made. The terminals of the conductors through which the connections are made have directly above them the numbers of the external terminals with which they connect. These various connecting conductors may have their terminals on a drum which may be turned like the ordinary drum controller to bring the connections for the various speeds in contact with the external terminals of the battery and armature. Any other ordinary type of switch or controller suitable for a considerable number of circuits might be used.

With the connections made as shown for the fourth speed ahead there would be one circuit from the battery through the armature as follows,—1', 7, 7', 1; there would be another independent circuit 2', 8, 8', 2; another independent circuit 3', 9, 9', 3; and so on, giving six independent circuits in all, and a very large current flow and high speed. For the 3d speed ahead, the battery units are shown as connected in parallel in groups of two, and the armature units connected in series in groups of two; thus the circuit is 1' and 2', 8, 8', 7, 7', 1 and 2; another independent circuit 3' and 4', 10, 10', 9, 9', 3 and 4; another independent circuit, 5' and 6', 12, 12', 11, 11', 5 and 6. For the second speed ahead, the battery units are shown connected in parallel in groups of three, and the armature units connected in series in groups of three; one circuit is 1' and 2' and 3', 9, 9', 8, 8', 7, 7', 1 and 2 and 3; there is another independent circuit at this speed which may be traced out on the same principle as above. For the lowest speed or the first speed ahead, all the battery units are in parallel and all the motor units are in series; that is, all the battery terminals 1' to 6' inclusive are connected to the terminal 12; the circuit then running 12, 12' 11, 11', 10, 10', 9, 9', 8, 8', 7, 7'; while 7' is connected to all the battery terminals 1 to 6 inclusive.

The same speeds may readily be obtained in the reverse direction as illustrated in Fig. 9 under Reverse,—the connections being similar to the ahead connections except that the connections to the positive and negative battery terminals are interchanged,—so that for example a connection is made to 1 instead of to 1'. The third speed reverse has not been diagrammed in Fig. 9 because of lack of space, but the manner of connection is like the corresponding speed ahead, except for the reversal of battery connections, which is effected in the same manner as shown in the first, second and fourth reverse speeds in Fig. 9. The great flexibility of such a method of control is evident, and many other arrangements and connections may be readily made as will be apparent to those skilled in the art.

Between the ahead connections and the reverse connections is shown a connection marked Brake which consists in completing the armature circuits through resistance marked R, R, etc., and which is numbered 46 in Figs. 1 and 2. The battery circuits are at this time disconnected. The resistance is shown as variable, in order that it may be reduced as the motor slows down, to keep the braking effect at a maximum; but it would operate almost as satisfactory if it were not variable. In Fig. 9 a separate resistance is shown in each independent armature circuit unit. In Figs. 1 and 2 only a single resistance 46 is shown, to which all the armature circuits would be simultaneously connected. Either form may be used,—the advantage of maintaining a number of independent circuits being the increase in reliability. The resistance need not necessarily be built in the controller itself; indeed, it is preferable to have the resistance elements outside of the controller proper, and they may be connected with the controller through suitable external terminals or brushes. A separate switch in the resistance circuit might also be used.

Figure 10:
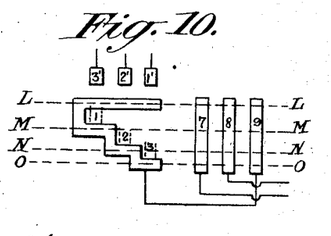
Fig. 10 illustrates a modified form of controller connection whereby different battery units may be used or charged.

Instead of connecting groups of battery units in parallel in the lower speeds, as 1, 2, 3, for example in the second speed, the battery units may be individually connected to the armature circuit. For example, in Fig. 10 the battery connection at the controller is shown as arranged in steps, while the armature contacts on the controller are extended so as to correspond to any of the steps. Thus for example at the second speed the detail shown in Fig. 10 illustrates how in the position O—O only the battery unit 1—1' of the first three units would be drawn upon; in the position N—N only the second of the first three units would be connected; and in the position M—M only the third of the first three units would be connected; while in the position L—L all of the first three battery units would be connected together in parallel, as shown in the second speed ahead of Fig. 9. The motor connections are shown as remaining the same whether a single battery unit or a group of battery units is connected. Thus at any speed if desired each armature circuit may have a separate and distinct battery circuit. Instead of steps on a controller of the drum type, a corresponding selective connection may be made by other means on other controllers as will be evident to those skilled in the art.

The principal elements of the propulsion system having been explained, and the combination having been shown, the general operation of the system as a whole will now be described. Referring to Figs. 1 and 2; when it is desired to charge the batteries, the engine 20 and the dynamo 28 are connected through the clutch 22, 26, (or 22', 26',) and the other clutches such as 37, 38, (or 37', 38'), are disconnected. The engine 20 then running at a high speed may then drive the dynamo 28 at a high speed. The number of series armature circuits and hence the voltage of the dynamo may be readily varied by means of the circuit controller 42, and hence the voltage of the dynamo 28 may be adjusted to the proper degree to charge the batteries. The large current capacity of a homopolar machine makes it particularly adapted for charging batteries. With the same clutch connection the homopolar machine 28 may also be run as a motor to start the engine 20 if desired. When it is desired to propel the vessel on the surface at cruising speed the clutch 22, 24 and the clutch 35, 37, may be engaged, to drive the propeller shaft 34 from the engine shaft 21 through the reduction gearing 25, 30, 32, 33. One of the two clutches in the gearing may be omitted, if desired, by keying the gear 25 or the gear 33 directly to the shaft, as has previously been described. In any case the propeller is turned at an economical speed with the engine running at a high speed. The engine may at the same time be charging the batteries if the clutch 22, 26 is arranged to be in engagement at the same time; so that part of the power of the engine would be expended in driving the propeller through the reduction gearing and part in driving the dynamo 28. The clutch 37, 38, between the dynamo 28 and the propeller shaft 34 would of course be disengaged when the clutch 22, 26 is in. An alternative connection for simultaneous cruising and charging would be by driving the propeller through the reduction gearing as described and at the same time engaging the clutch 37, 38 while disengaging the clutch 22, 26. Here the dynamo would run at a slower speed. It should be understood that the clutches are merely conventionally shown on the drawings, and in practice it would be desirable to use friction clutches or magnetic clutches instead of jaw clutches, to avoid straining the machinery and to permit prompt engagement. In Fig. 2 the connection for ordinary surface running would be with the clutches 22', 26', and 38', 37', engaged,—and the drive is direct from the engine 20 through the shaft 27 to the propeller shaft 34. A small amount of charging current for the batteries might be simultaneously drawn from the dynamo 28 if desired.

For submerged running in both Figs. 1 and 2 the clutches connected with the engine are disconnected and the clutches connecting the motor shaft 27 and the propeller shaft 34 are engaged, so that the vessel is propelled solely by the motor 28. This may be at a good speed if a high quantity of current is passed through the motor, as will be considered later.

When the vessel is to be propelled on the surface at high speed both the engine 20 and the motor 28 are directly connected to the propeller shaft 34, as by engaging the clutches 22, 26, and 37, 38 in Fig. 1; or 22', 26', and 37', 38', in Fig. 2. With this direct drive from both power plants at high speed the advantage of the reduction gearing for cruising speeds appears. That is, in Fig. 2, where there is direct drive from the engine 20 at both cruising and fighting speeds, the engine 20 must either run considerably below its best speed when cruising or considerably above its proper speed in fighting. While in the modification shown in Fig. 1 the engine 20 may run at its proper high speed when propelling the vessel at cruising speed through the reduction gearing, and may also run at its proper high speed when driving the propeller 36 at its fighting speed through a direct connection,—in the latter case being assisted by the motor 28. A larger propeller may be used than could be directly driven by the engine. The modification illustrated in Fig. 2 has the advantage of greater simplicity; while Fig. 1 gives the best cruising speed with engines of equal power, since the engine may run faster and develop more power when cruising.

The electric motors heretofore used for submarines run on a single armature circuit or at most a very few armature circuits, and hence the current carrying capacity of the armature circuit can not be readily altered; so that when the load increases with an attempted great increase in speed there is danger of burning out the armature windings. With the homopolar type of motor which has been described the armature conductors are not wires or thin tapes as in the ordinary type of machine but consist of large bars which may be connected in parallel to any desired degree through the brushes overlapping them and which can carry enormous currents with safety. For example in the 4th speed ahead illustrated in Fig. 9 each battery unit is practically short-circuited across the armature permitting a very rapid discharge and a great extraction of power even though the voltage is not high in any unit. The use of a large number of separate armature circuits allows a considerable number of different running speeds with a constant strong field excitation and without the use of resistances. It also gives a powerful starting and reversing torque, and increases the maneuvering abilities of the vessel, especially when used in combination with the electric resistance as a brake.

While I have for the purpose of illustration shown my system of propulsion for submarines in a particular form, it is adapted to numerous modifications, as will be evident to those skilled in the art. Accordingly I do not wish to limit myself to the particular construction and arrangement of parts here shown, but aim to cover all the modifications within the scope of my invention, as pointed out in the appended claims. It will be noted that those parts of the invention covered by claims 3 to 6 inclusive are not limited necessarily to electric machines of the homopolar type, but that any suitable electric machine of the ordinary type might be used.

I claim—

1. In a ship propulsion system, the combination of a source of electric energy, said source containing a number of units each capable of generating an electro-motive force, a homopolar electric machine having a number of independent armature circuits, a controller, leads connecting the units of the source of electric energy to the controller, leads connecting the independent armature circuits to the controller, said controller being adapted to connect separate units of the source of electric energy with independent armature circuits of the homopolar machine so as to give separate power transmission circuits between the source of electric energy and the homopolar electric machine.

2. In a ship propulsion system, the combination of an internal combustion engine, a homopolar electric machine, a propeller shaft, a clutch affording a direct drive between the engine and the homopolar machine, a clutch affording a direct drive between the homopolar machine and the propeller shaft, whereby there may be a direct drive from the engine to the propeller shaft, a reduction gearing between the engine and the propeller shaft affording a reduction drive between the engine and said shaft whereby the engine at full speed may drive the propeller shaft at reduced speed, and a clutch adapted to disconnect said gearing.

3. In a ship propulsion system, the combination of an internal combustion engine, an electric machine, a propeller shaft, a reduction gearing between the engine and the propeller shaft, a clutch whereby the said gearing may be disconnected, a clutch giving a direct drive between the engine and the electric machine, a clutch giving a direct drive between the electric machine and the propeller shaft, whereby the electric machine may directly drive the propeller shaft, the engine may directly drive the propeller shaft, the engine and electric machine may together directly drive the propeller shaft, the engine may directly drive the electric machine, and the engine may drive the propeller shaft through reduction gearing.

4. In a propulsion system, the combination of an engine, an electric machine, a propeller, mechanical means whereby the engine alone running at full speed may drive the propeller at moderate speed, and means whereby the engine running at full speed aided by the electric machine may by their combined power drive the propeller at high speed.

5. In a propulsion system, the combination of a storage battery containing a large number of cells, an electric machine having a number of independent armature circuits, and means for connecting independent groups of battery cells to independent armature circuits in said machine, whereby said machine may run simultaneously on several independent battery-armature circuits.

6. In a propulsion system, the combination of an engine, a propeller, a speed reducing device through which the engine may drive the propeller at reduced speeds, means for disconnecting said device, a direct drive which may be connected between the engine and the propeller, and auxiliary electrical means for aiding the engine to drive the propeller under the direct drive conditions.

In witness whereof I have hereunto set my hand this 24th day of April, 1915.

ROBERT V. MORSE.

Witnesses:
  H. U. HINCKLEY,
  H. W. BUTLER.